US012588125B2

(12) United States Patent
Liu et al.

(10) Patent No.: US 12,588,125 B2
(45) Date of Patent: Mar. 24, 2026

(54) HYSTERESIS CIRCUIT, EMERGENCY LIGHTING CIRCUIT AND LIGHTING DEVICE

(71) Applicants: OPPLE LIGHTING CO., LTD., Shanghai (CN); SUZHOU OPPLE LIGHTING CO., LTD., Suzhou City (CN)

(72) Inventors: Xinsheng Liu, Shanghai (CN); Guangchuan Zhu, Shanghai (CN)

(73) Assignees: OPPLE LIGHTING CO., LTD., Shanghai (CN); SUZHOU OPPLE LIGHTING CO., LTD., Suzhou City (CN)

(*) Notice: Subject to any disclaimer, the term of this patent is extended or adjusted under 35 U.S.C. 154(b) by 125 days.

(21) Appl. No.: 18/437,535

(22) Filed: Feb. 9, 2024

(65) Prior Publication Data

US 2024/0244731 A1 Jul. 18, 2024

Related U.S. Application Data

(63) Continuation of application No. PCT/US2022/111107, filed on Aug. 9, 2022.

(51) Int. Cl.
*H05B 47/14* (2020.01)

(52) U.S. Cl.
CPC .................................... *H05B 47/14* (2020.01)

(58) Field of Classification Search
CPC .. H05B 47/14; H02H 3/24; H02H 1/00; H02J 9/06
See application file for complete search history.

(56) References Cited

U.S. PATENT DOCUMENTS 11,083,058 B2 8/2021 Chen et al.
2012/0139422 A1* 6/2012 Ren .................... H05B 45/3575 315/126

FOREIGN PATENT DOCUMENTS

| | | | | |
|---|---|---|---|---|
| CN | 101882879 A | | 11/2010 | |
| CN | 106208656 A | | 12/2016 | |
| CN | 208955639 U | * | 6/2019 | |
| CN | 209215474 U | * | 8/2019 | |
| CN | 209559340 U | * | 10/2019 | |
| CN | 111917103 A | * | 11/2020 | ............. H02M 1/32 |

(Continued)

OTHER PUBLICATIONS

English Translation of CN-208955639-U (Year: 2019).*

(Continued)

*Primary Examiner* — Daniel D Chang
(74) *Attorney, Agent, or Firm* — Arch & Lake LLP; Hao Tan; Shen Wang

(57) ABSTRACT

The present disclosure discloses a hysteresis circuit, an emergency lighting circuit, and a lighting device. The hysteresis circuit includes a voltage detection module, an isolation coupling module, and a voltage adjusting module. By detecting the sampling voltage associated with the input voltage, in the case that the sampling voltage is detected to decrease to the trigger action voltage point, the corresponding level of the output signal flips until it is detected that the sampling voltage rises to the reverse recovery voltage point, and the corresponding level of the output signal is controlled to flip again, thus achieving timely and accurate judgment of input voltage status.

10 Claims, 4 Drawing Sheets

(56) References Cited

FOREIGN PATENT DOCUMENTS

| | | | |
|---|---|---|---|
| CN | 113507772 | A | 10/2021 |
| WO | 2019134852 | A1 | 7/2019 |

OTHER PUBLICATIONS

English Translation of CN-111917103-A (Year: 2020).*
English Translation of CN-209215474-U (Year: 2019).*
English Translation of CN-209559340-U (Year: 2019).*
International Search Report of PCT/CN2022/111107 dated Oct. 11, 2022 with English translation, (4p).

* cited by examiner

HYSTERESIS CIRCUIT, EMERGENCY LIGHTING CIRCUIT AND LIGHTING DEVICE

CROSS-REFERENCE TO RELATED APPLICATION

The present application is based upon and claims the priority of PCT patent application No. PCT/CN2022/111107 filed on Aug. 9, 2022 claims the priority of the Chinese patent application with application number 202110936145.2 filed on Aug. 16, 2021, the entire contents of which are hereby incorporated by reference herein for all purposes.

TECHNICAL FIELD

The present disclosure relates to a field of lighting circuit technology, specifically to a hysteresis circuit, an emergency lighting circuit, and a lighting device.

BACKGROUND

Lighting that is activated due to the failure of the normal lighting power supply is called as emergency lighting. The emergency lighting is different from ordinary lighting, and the emergency lighting includes three types: backup lighting, evacuation lighting, and safety lighting. The emergency lighting is an important safety facility in modern public building and industrial building, and it is closely related to personal safety and building safety. When a building experiences a fire or other disaster, and the power supply is interrupted, the emergency lighting plays an important role in personnel evacuation, fire rescue work, and the continued operation or necessary operation and disposal of important production and work.

SUMMARY

The present disclosure provides a hysteresis circuit, an emergency lighting circuit, and a lighting device.

According to one aspect of the present disclosure, an example of the present disclosure provides a hysteresis circuit, the hysteresis circuit may include: a voltage detection module, configured to receive an input voltage and generate a sampling voltage based on the input voltage, and detect the sampling voltage; a solation coupling module, configured to control an output signal of the isolation coupling module based on the sampling voltage; and a voltage adjusting module, configured to adjust the sampling voltage; in a case that the voltage detection module detects that the sampling voltage is less than a first set value, an optocoupler in the isolation coupling module is controlled to be in an isolating state, so that the output signal of the isolation coupling module is a first level signal, and the voltage adjusting module begins to adjust the sampling voltage; in a case that the voltage detection module detects that the sampling voltage is greater than a second set value, the optocoupler is controlled to be in a coupling state, so that the output signal of the isolation coupling module is a second level signal, and the voltage adjusting module stops adjusting the sampling voltage, the second set value is greater than the first set value, and a difference between the second set value and the first set value is greater than a preset threshold, the first level signal is different from the second level signal.

According to another aspect of the present disclosure, an example of the present disclosure provides an emergency lighting circuit, and the emergency lighting circuit comprises a rectification circuit, configured to convert an input AC power into a DC power to provide the DC power to the hysteresis circuit; the hysteresis circuit in the above example of the present disclosure; a control circuit, configured to control an operation of an indicator light or a relay based on the output signal of the isolation coupling module in the hysteresis circuit.

According to another aspect of the present disclosure, an example of the present disclosure provides a lighting device, and the lighting device comprises an emergency lighting circuit as described in the above example of the present disclosure.

It is to be understood that both the foregoing general description and the following detailed description are exemplary and explanatory only and are not restrictive of the present disclosure.

BRIEF DESCRIPTION OF DRAWINGS

Based on the drawings, detailed descriptions of the examples of the present disclosure will make the technical solutions and other beneficial effects of the present disclosure obvious.

DETAILED DESCRIPTION

Figure 1:
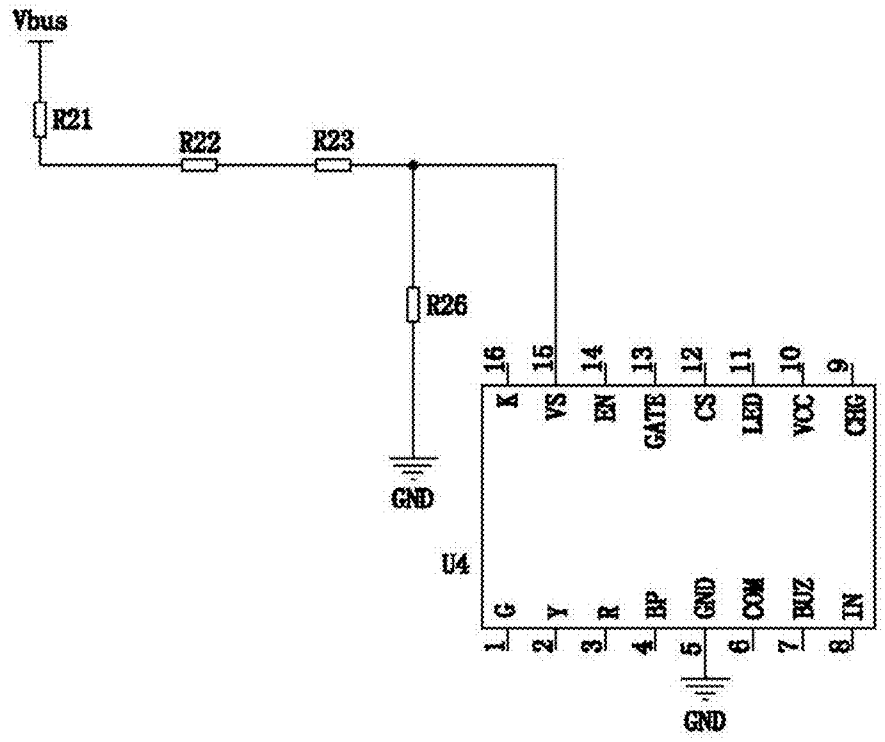
FIG. 1 (Prior Art)
FIG. 1 is a schematic diagram of a hysteresis circuit in the prior art.

The following will provide a clear and complete description of the technical solution in the examples of the present disclosure, in conjunction with the accompanying drawings. Obviously, the described examples are only a portion of the examples of the present disclosure, not the all examples. Based on the examples in the present disclosure, all other examples obtained by those skilled in the art without creative labor fall within the protection scope in the present disclosure.

The terms “first” and “second” in the text are only used to describe the purpose and cannot be understood as indicating or implying relative importance or implying the quantity of technical features indicated. Therefore, the features limited to “first” and “second” may explicitly or implicitly include one or more of the features. In the descriptions of the present disclosure, “a plurality of” means two or more, unless otherwise specified.

In the descriptions of the present disclosure, it should be noted that unless otherwise specified and limited, the terms “installation”, “connection”, and “coupling” should be broadly understood, for example, they can be fixed connections, detachable connections, or integrated connections; they can be mechanical connections, electrical connections, or signal connections with each other; they can be direct connection or indirect connection through an intermediate medium, and can be the internal connection of two components or the interaction relationship between two components. For ordinary technical personnel in this field, the specific meanings of the above terms in the present disclosure can be understood based on specific circumstances.

The following disclosure provides many different implementation methods or examples to implement the different structures of the present disclosure. In order to simplify the disclosure of the present disclosure, specific examples of components and arrangements will be described below. Of course, they are only examples and are not intended to limit the present disclosure. In addition, the present disclosure may repeat reference numbers and/or reference letters in different examples for the purpose of simplification and clarity, and does not indicate the relationship between the various examples and/or arrangements discussed.

Sometimes, the fire emergency lighting and evacuation indication system includes the power supply of emergency lighting fixtures and evacuation indication fixtures. For non centrally controlled emergency lighting centralized power supply, there are the following regulations, there are the following regulations: when the main power supply voltage of the lamp works at any voltage within the range of 60%-80% of its rated voltage, the status indicator lights and the relays of the emergency lighting centralized power supply should not have multiple switching phenomena. If multiple switching phenomena occur, it will inevitably cause ripple and instability of the main power supply voltage of the lamp.

Therefore, the technical personnel proposed a scheme as shown in FIG. 1 to determine the situation of the main power supply voltage of the lamp. As shown in FIG. 1, for non isolated power supplies, the ADC sampling value is obtained by using a microcontroller U4, and the following logical judgment is made: determining whether the input voltage Vbus has reached the trigger action voltage point, and when it returns to normal operation, determining whether the input voltage Vbus has reached the reverse recovery voltage point. The trigger action voltage point refers to the voltage value corresponding to reaching a preset function (such as triggering an emergency function), and the reverse recovery voltage point refers to the voltage value corresponding to before restoring to the preset function (such as restoring to normal operation).

However, the above scheme has specific limitations, which include: 1) only for non isolated power sources, where the input voltage and the microcontroller are grounded, making the scheme suitable for applications with broad requirements for product safety design; 2) only suitable for circuits with microcontroller control and suitable ADC sampling value detection ports.

Therefore, it is necessary to propose solutions for existing technical problems.

Figure 2:
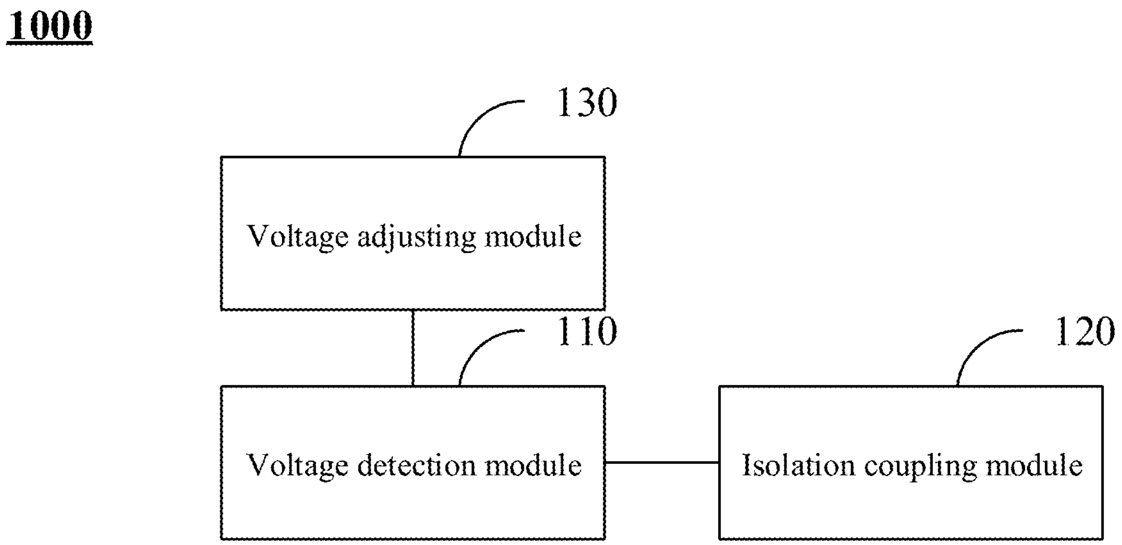
FIG. 2 is a schematic diagram of an architecture of a hysteresis circuit provided by an example of the present disclosure.

FIG. 2 is a schematic diagram of an architecture of a hysteresis circuit provided by an example of the present disclosure.

Figure 3:
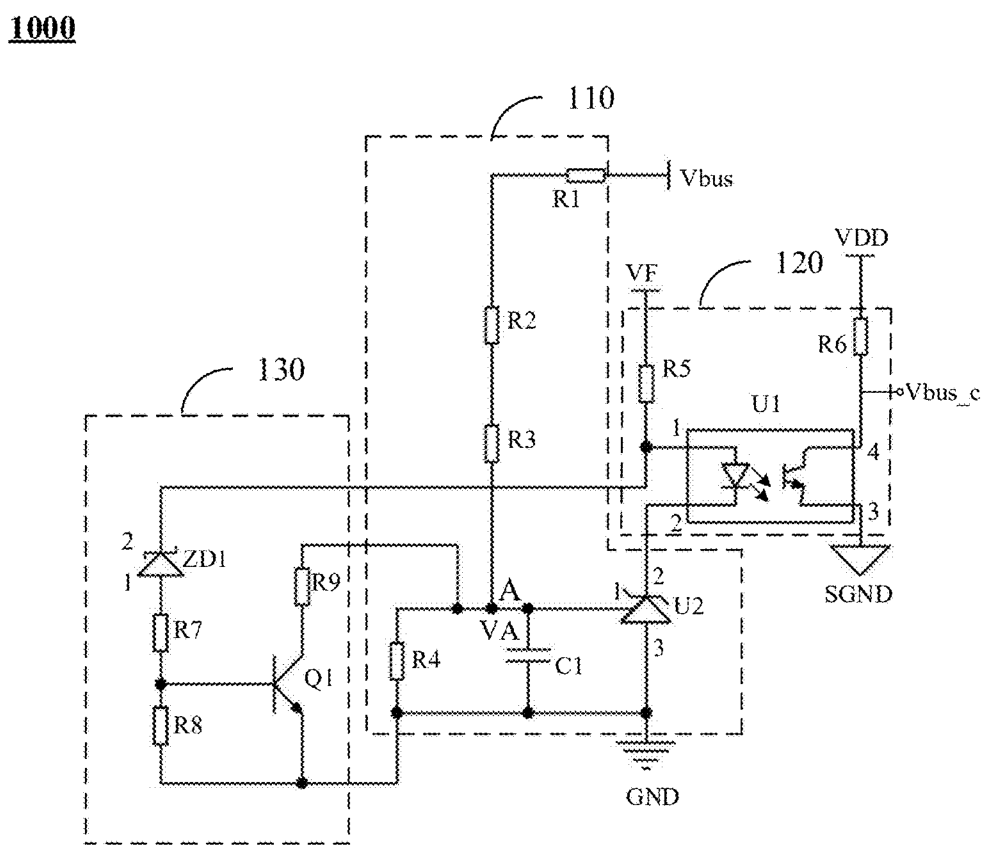
FIG. 3 is a schematic diagram of a hysteresis circuit provided by an example of the present disclosure.

As shown in FIG. 2 and FIG. 3, at least one example of the present disclosure provides a hysteresis circuit 1000, the hysteresis circuit 1000 includes a voltage detection module 110 configured to receive an input voltage Vbus, generate a sampling voltage VA based on the input voltage Vbus, and detect the sampling voltage VA; an isolation coupling module 120 configured to control the output signal Vbus_c of the isolation coupling module 120 based on the sampling voltage; a voltage adjusting module 130 configured to adjust the sampling voltage VA; in a case that the voltage detection module 110 detects that the sampling voltage VA is less than a first set value, the optocoupler U1 in the isolation coupling module 120 is controlled to be in an isolating state, so that the output signal Vbus_c of the isolation coupling module 120 is a first level signal, and the voltage adjusting module 130 starts adjusting the sampling voltage VA; in a case that the voltage detection module 110 detects that the sampling voltage VA is greater than a second set value, the optocoupler U1 is controlled to be in a coupling state, so that the output signal Vbus_c of the isolation coupling module 120 is a second level signal, and the voltage adjusting module 130 stops adjusting the sampling voltage VA, the second set value is greater than the first set value, and the difference between the second set value and the first set value is greater than a preset threshold. The first level signal is different from the second level signal.

This design can achieve hysteresis design for input voltage detection, enabling timely and accurate judgment of the status of the input voltage, and also ensuring that the corresponding emergency lighting circuit operates normally according to specified requirements, thereby improving the reliability and safety of the lighting device.

The following will further describe the structure of the hysteresis circuit 1000 in conjunction with FIG. 3.

As shown in FIG. 2 and FIG. 3, an example of the present disclosure provides a hysteresis circuit 1000, which includes a voltage detection module 110, an isolation coupling module 120, and a voltage adjusting module 130.

Specifically, the voltage detection module 110 may include: a first voltage divider resistor and a second voltage divider resistor, a first capacitor C1, and a voltage regulator U2. A first end of the first voltage divider resistor receives the input voltage, and a second end of the first voltage divider resistor is connected to a first end of the second voltage divider resistor to form a first node A. The first voltage divider resistor and the second voltage divider resistor are configured to divide the input voltage so that the voltage of the first node A is the sampling voltage. In the present example, the first voltage divider resistor may include a first resistor R1, a second resistor R2, and a third resistor R3, but in other partial examples, the first voltage divider resistor may include a plurality of resistors or only one resistor. The second voltage divider resistor is the fourth resistor R4 (which will be described below as the fourth resistor). As shown in FIG. 2, specifically, a first end of the first resistor R1 receives the input voltage Vbus, and a second end of the first resistor R1 is electrically connected to a first end of the second resistor R2. A second end of the second resistor R2 is electrically connected to a first end of the third resistor R3, and a second end of the third resistor R3 is electrically connected to a first end of the fourth resistor R4, a first end of the first capacitor C1, and a first pin of the voltage regulator U2, respectively. The first end of the fourth resistor R4 is electrically connected to the first end of the first capacitor C1 and the first pin of the voltage regulator U2, respectively. A second end of the fourth resistor R4 is electrically connected to a second end of the first capacitor C1 and a third pin of the voltage regulator U2, respectively. The first end of the first capacitor C1 is electrically connected to the first pin of the voltage regulator U2, and the second end of the first capacitor C1 is electrically connected to the third pin of the voltage regulator U2. A second pin of the voltage regulator U2 is connected to the isolation coupling module 120, and the third pin of the voltage regulator U2 is connected to a power ground.

In the voltage detection module 110, the first resistor R1, the second resistor R2, the third resistor R3, and the fourth resistor R4 are sequentially connected in series. The first resistor R1 receives the input voltage Vbus. The input voltage Vbus may be a DC voltage, which can be obtained through the rectification circuit in the emergency lighting circuit. In the present example, the resistance values of the first resistor R1, the second resistor R2, and the third resistor R3 are the same and different from the resistance value of the fourth resistor R4. The fourth resistor R4 and the three resistors mentioned above (the first resistor R1, the second resistor R2, and the third resistor R3) divide the input voltage to obtain the sampling voltage VA of the first node A. As shown in FIG. 3, the voltage of the first node A is the sampling voltage VA, which is the same in the following text. In this case, the voltage obtained from the first pin of the voltage regulator U2 is the sampling voltage VA. When the sampling voltage obtained by the first pin of the voltage regulator U2 is less than the first set value, the voltage regulator U2 is in a cut-off state; when the sampling voltage obtained by the first pin of the voltage regulator U2 is greater than the second set value, the voltage regulator U2 is in a conductive state. Therefore, the voltage regulator U2 can be regarded as a switching element.

Furthermore, the first capacitor C1 is connected in parallel with the fourth resistor R4, which is configured to filter the voltage signal received by the first pin of the voltage regulator U2. In the present example, the voltage regulator U2 may adopt a TL431M type voltage regulator, with an internal reference voltage of 2.5V. If other models of voltage regulators are used, their internal reference voltage may be different.

The isolation coupling module 120 includes a fifth resistor R5, a sixth resistor R6, and an optocoupler U1. A first end of the fifth resistor R5 receives a first side supply voltage VF, and a second end of the fifth resistor R5 is electrically connected to a positive electrode of a light-emitting diode on a primary side of the optocoupler U1. A first end of the sixth resistor R6 is connected to a second side supply voltage VDD, and a second end of the sixth resistor R6 is electrically connected to a collector electrode of a triode on a secondary side of the optocoupler U1. A negative electrode of the light-emitting diode on the primary side of the optocoupler U1 is electrically connected to a second pin of the voltage regulator U2 in the voltage detection module 110, and an emitter electrode of the triode on the secondary side of the optocoupler U1 is connected to a signal ground.

In the present example, the optocoupler U1 adopts an EL817 type optocoupler, which is not limited to this. When the light-emitting diode on the primary side of the optocoupler U1 is conductive, the triode on the secondary side works normally, causing the optocoupler U1 to be in a coupling state. When the light-emitting diode on the primary side of the optocoupler U1 is cut off, the triode on the secondary side does not work, so that the optocoupler U1 is in an isolating state.

It should be noted that, the first side supply voltage VF received by the first end of the fifth resistor R5 and the second side supply voltage VDD received by the first end of the sixth resistor R6 are both fixed supply voltages. In addition, in the present example, the power ground connected to the voltage regulator U2 in the voltage detection module 110 on the primary side of the optocoupler U1 is not in common ground with the signal ground connected to the secondary side of the optocoupler U1. Of course, in other examples, the power ground and the signal ground can be grounded together (applicable to non isolated power sources).

Continuing to refer to FIG. 2 and FIG. 3, the voltage adjusting module 130 includes: a first voltage stabilizing transistor ZD1, a seventh resistor R7, an eighth resistor R8, a ninth resistor R9, and a first switching transistor Q1. A first end of the first voltage stabilizing transistor ZD1 is electrically connected to a first end of the seventh resistor R7, and a second end of the first voltage stabilizing transistor ZD1 is electrically connected to the second end of the fifth resistor R5 in the isolation coupling module 120. A second end of the seventh resistor R7 is electrically connected to a first end of the eighth resistor R8 and a control end of the first switching transistor Q1, respectively. A first end of the eighth resistor R8 is electrically connected to the control end of the first switching transistor Q1, and a second end of the eighth resistor R8 is electrically connected to a first end of the first switching transistor Q1. A first end of the ninth resistor R9 is electrically connected to a first end of the fourth resistor R4 in the voltage detection module 110, and a second end of the ninth resistor R9 is electrically connected to a second end of the first switching transistor Q1. The first end of the first switching transistor Q1 is respectively connected to a second end of the fourth resistor R4 in the voltage detection module 110 and a power ground.

In the present example, the ninth resistor R9 is connected in series with the first switching transistor Q1, and then connected in parallel with the fourth resistor R4. When the first switching transistor Q1 is in a conductive state, its conducting resistance is connected in series with the ninth resistor R9, and then in parallel with the fourth resistor R4. When the first switching transistor Q1 is in the cut-off state, its resistance value is very high, after being connected in series with the ninth resistor R9, the effect on the resistance value of the fourth resistor R4 connected in parallel can be ignored. In other words, when the first switching transistor Q1 is in a conductive state, the ground resistance of the first pin of the voltage regulator U2 is an equivalent resistance corresponding to the parallel connection of the fourth resistor R4, the ninth resistor R9, and the conduction resistance of the first switching transistor Q1. When the first switching transistor Q1 is in the cut-off state, the resistance value of the first switching transistor Q1 is very large. Therefore, the ground resistance of the first pin of the voltage regulator U2 is the fourth resistor R4. In this way, when the first switching transistor Q1 is turned on, the ground resistance of the first pin of the voltage regulator U2 is smaller than the ground resistance of the first pin of the voltage regulator U2 when the first switching transistor Q1 is turned off.

Optionally, in the present example, the fourth resistor R4 in the voltage detection module 110 and the ninth resistor R9 in the voltage adjusting module 130 are variable resistors. When the input voltage remains constant and the resistance value of the fourth resistor R4 increases, the sampling voltage VA increases. When the input voltage remains unchanged and the resistance value of the fourth resistor R4 decreases, the sampling voltage VA decreases. Furthermore, in the case where the first switching transistor Q1 is in a conductive state, as the resistance value of the ninth resistor R9 increases, the hysteresis voltage decreases. When the resistance value of the ninth resistor R9 decreases, the hysteresis voltage increases. The hysteresis voltage will be further explained in the following text. Therefore, the first set value (i.e. trigger voltage action point) can be configured to be associated with the resistance value of the fourth resistor, and the second set value (i.e. reverse recovery voltage point) can be configured to be associated with the resistance value of the ninth resistor.

The following will further explain the working principle of the hysteresis circuit 1000.

When the input voltage Vbus is different, the sampling voltage VA changes accordingly. If the input voltage is high, the sampling voltage VA is high. If the input voltage is low, the sampling voltage VA is low.

If the input voltage Vbus decreases and gradually decreases to the following situation: when the sampling voltage VA is less than the internal reference voltage of the voltage regulator U2, the sampling voltage VA reaches the trigger voltage action point (i.e. the first set value), and the voltage regulator U2 enters the cut-off state, then the light-emitting diode on the primary side of the optocoupler U1 is not conducting (i.e. in the cut-off state), and the optocoupler U1 is in an isolating state. When the optocoupler U1 is in an isolating state, the output signal Vbus_c of the isolated coupling module 120 is the first level signal. In the present example, the first level signal is a high level. In this case, due to the cut-off state of the light-emitting diode on the primary side of the optocoupler U1, that is, the first pin of the optocoupler U1 shown in FIG. 3 is at a high level, the first switching transistor Q1 is in a conductive state, therefore, its conducting resistance is connected in series with the ninth resistor R9, and then connected in parallel with the fourth resistor R4, resulting in a decrease of the sampling voltage VA.

If the input voltage Vbus changes from decreasing to increasing and gradually increases. When the input voltage Vbus returns to the original input voltage, the sampling voltage VA is still less than the internal reference voltage of the voltage regulator U2, because the conducting resistance of the first switching transistor Q1 is connected in series with the ninth resistor R9 and then in parallel with the fourth resistor R4.

Next, the input voltage Vbus continues to increase until the following situation occurs: when the sampling voltage VA is greater than the internal reference voltage of the voltage regulator U2, the sampling voltage VA reaches the reverse recovery voltage point (i.e. the second set value), and the voltage regulator U2 enters the conductive state. Therefore, the light-emitting diode on the primary side of the optocoupler U1 is in the conductive state, and the optocoupler U1 is in the coupling state. When the optocoupler U1 is in the coupling state, the output signal Vbus_c of the isolation coupling module 120 changes from the first level signal to the second level signal. In the present example, the second level signal is a low-level signal, which is different from the first level signal. If the first level signal is a high-level signal and the second level signal is a low-level signal, then these two signals are opposite. Therefore, the output signal Vbus_c of the isolation coupling module 120 changes from high level to low level. In this case, due to the conductive state of the light-emitting diode on the primary side of the optocoupler U1, that is, the first pin of the optocoupler U1 shown in FIG. 3 is at a low level, the first switching transistor Q1 is in a cut-off state. Therefore, the resistance value of the first switching transistor Q1 is very high, after being connected in series with the ninth resistor R9, the effect on the resistance value of the fourth resistor R4 connected in parallel can be ignored, resulting in an increase of the sampling voltage VA. Therefore, it can further ensure that the sampling voltage VA is greater than the internal reference voltage of the voltage regulator U2, thereby enabling the output signal Vbus_c of the isolation coupling module 120 remains a low-level signal.

It should be noted that the second set value is greater than the first set value, and the difference between the second set value and the first set value is greater than the preset threshold, the preset threshold is related to the resistance values of the ninth resistor R9 and the first switching transistor Q1 in the voltage adjusting module 130. Therefore, the voltage value corresponding to the reverse recovery voltage point is greater than the voltage value corresponding to the trigger action voltage point. Furthermore, the trigger action voltage point (i.e. the point corresponding to the action voltage) is related to the resistance value of the fourth resistor R4. The reverse recovery voltage point (i.e. the point corresponding to the hysteresis voltage) is related to the resistance values of the ninth resistor R9 and the first switching transistor Q1. When the first switching transistor Q1 is in a conductive state, the hysteresis voltage decreases as the resistance value of the ninth resistor R9 increases. When the resistance value of the ninth resistor R9 decreases, the hysteresis voltage increases.

In the hysteresis circuit 1000 provided by any one of the examples of the present disclosure, a hysteresis design for detecting the input voltage is achieved by setting a trigger action voltage point and a reverse recovery voltage point with a certain voltage difference, which enables timely and accurate judgment of the state of the input voltage, further ensuring that the corresponding emergency lighting circuit operates normally under specified requirements, and improving the reliability and safety of the product.

In addition, in the hysteresis circuit 1000 provided by any one of the examples of the present disclosure, because the power ground connected to the primary side of the optocoupler U1 through the voltage regulator U2 in the voltage detection module 110 is not in common ground with the signal ground connected to the secondary side of the optocoupler U1, the hysteresis circuit 1000 can be suitable for isolating the power supply and does not use a microcontroller to detect sampling values, which makes that the hysteresis circuit 1000 described in the present disclosure more widely applicable.

Based on the same invention concept, at least one example of the present disclosure further provides an emergency lighting circuit.

Figure 4:
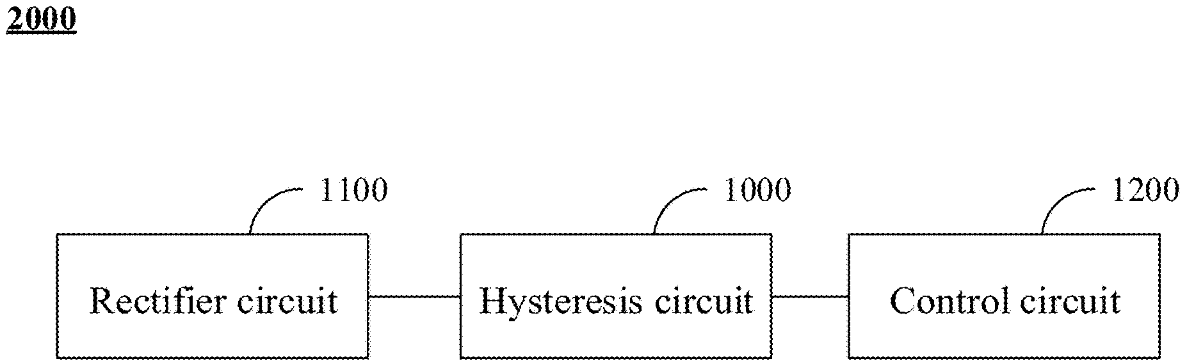
FIG. 4 is a schematic diagram of an emergency lighting circuit provided by an example of the present disclosure.

As shown in FIG. 4, the emergency lighting circuit 2000 includes a rectifier circuit 1100, a hysteresis circuit 1000, and a control circuit 1200.

Specifically, the rectifier circuit 1100 is configured to convert the input AC power into DC power to provide the DC power to the hysteresis circuit 1000.

The hysteresis circuit is the hysteresis circuit 1000 described in any one of the previous examples, and its specific structure and working principle are described above, which will not be repeated here.

The control circuit 1200 is configured to control the output signal Vbus_c of the isolation coupling module 120 in the hysteresis circuit 1000 to control whether the indicator light (not shown in the figure) or relay (not shown in the figure) is working.

When determining the voltage value corresponding to the output signal Vbus_c is less than the preset threshold, the status indicator light or relay is controlled to work; when determining the voltage value corresponding to the output signal Vbus_c is greater than or equal to the preset threshold, the status indicator light or the relay is controlled to stop working. The status indicator light or the relay is connected to the control circuit 1200. In the present example, when it is determined that the output signal Vbus_c is a low-level signal, the status indicator light is in the turn-on state, or the relay is controlled to enter the working state. When determining the output signal Vbus_c is a high-level signal, the status indicator light is in the turned-off state or the relay is controlled to stop working.

As described in the background, when the main power voltage of the lamp operates at any voltage within the range of 60%-80% of its rated voltage, the status indicator lights and the relays of the emergency lighting centralized power should not undergo multiple switching phenomena. If multiple switching phenomena occur, it will inevitably cause ripple and instability of the main power voltage of the lighting fixture. Therefore, the present disclosure provides an emergency lighting circuit 2000, which adopts the hysteresis circuit 1000 described above, for detecting and controlling the main power voltage (i.e. input voltage) of the lamp.

During the process of the main power voltage reducing to 60% to 80% of the rated voltage (i.e. the input voltage Vbus of the lamp is reduced from 100% of the rated voltage to 60%-80% of the rated voltage), the sampling voltage VA in the hysteresis circuit 1000 decreases correspondingly with the decrease of the input voltage. When the trigger action voltage point is reached, the voltage regulator U2 is in the cut-off state, and the corresponding optocoupler U1 is in the isolating state, so that the output signal Vbus_c of the isolation coupling module 120 is a high-level signal. Because the output signal Vbus_c of the isolation coupling module 120 is a high-level signal (i.e. the output signal of the hysteresis circuit is a high-level signal), therefore, the status indicator light connected to the control circuit 1200 in the emergency lighting circuit 2000 is in the turn-off state, or the relay connected to the control circuit 1200 stops working.

Correspondingly, the lamp connected to the relay also does not work, for example, the lamp is in the turn-off state.

During the process of the main power voltage rising to above 80% of the rated voltage (i.e. the input voltage Vbus of the lamp rises from 60%-80% of the rated voltage to above 80% of the rated voltage), the sampling voltage in the hysteresis circuit 1000 increases correspondingly with the increase of the input voltage, and when the reverse recovery voltage point is reached, the voltage regulator U2 is in a conductive state, and the corresponding optocoupler U1 is in a conductive state, so that the output signal Vbus_c of the isolation coupling module 120 is a low-level signal. Because the output signal Vbus_c of the isolation coupling module 120 is a low-level signal (i.e. the output signal of the hysteresis circuit is a low-level signal), the status indicator light connected to the control circuit 1200 in the emergency lighting circuit 2000 is in the lighting state. In this case, the relay connected to the control circuit 1200 starts working, and accordingly, the lamp connected to the relay enters the working state, for example, the lamp is in the lighting state.

Because the setting of the trigger action voltage point and the reverse recovery voltage point with a certain voltage difference in the hysteresis circuit 1000, it is possible to make timely and accurate judgments on the state of the input voltage, furthermore, it can also ensure that the corresponding emergency lighting circuit 2000 operates normally under specified requirements (i.e., when the main power voltage drops to the range of 60%-80% of its rated voltage, the status indicator light or the relay does not work, and when the main power voltage rises to more than 80% of its rated voltage, the status indicator light or the relay enters the working state), which can improve the reliability and safety of the lamp.

Based on the same invention concept, at least one example of the present disclosure further provides a lighting device.

Figure 5:
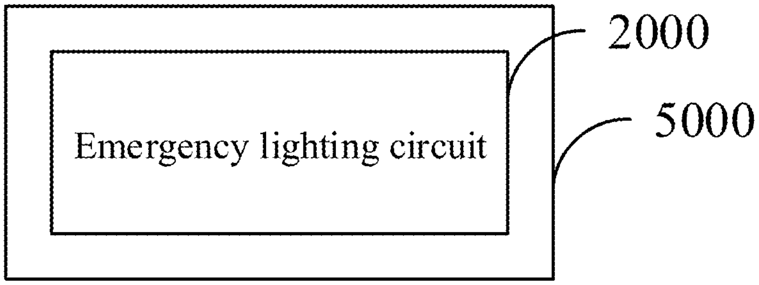
FIG. 5 is a schematic diagram of a lighting device provided by an example of the present disclosure.

As shown in FIG. 5, the lighting device 5000 includes the emergency lighting circuit 2000 mentioned above. The lighting device 5000 may be an emergency lighting centralized power supply or a self-contained power type lamp. In some examples, the emergency lighting centralized power supply is a non centralized control type emergency lighting centralized power supply. In other examples, the automatic power supply type lamp is a self-contained power supply non centralized control type lamp. When the main power voltage of these devices drops to the range of 60%-80% of their rated voltage, the status indicator light or the relay does not work. When the main power voltage of these devices rises to more than 80% of the rated voltage, the status indicator light or the relay enters the working state, thereby improving the safety and reliability of the lighting device.

The present disclosure provides a hysteresis circuit, an emergency lighting circuit, and a lighting device, which aims to detect a sampling voltage associated with the input voltage. When the sampling voltage is detected to decrease to the trigger action voltage point, the corresponding level of the output signal is controlled to flip until it is detected that the sampling voltage has risen to the reverse recovery voltage point, the corresponding level of the output signal is controlled to flip again, so as to achieve timely and accurate monitoring of the input voltage status, further improving the reliability and safety of the product.

According to one aspect of the present disclosure, an example of the present disclosure provides a hysteresis circuit, the hysteresis circuit includes: a voltage detection module, configured to receive an input voltage and generate a sampling voltage based on the input voltage, and detect the sampling voltage; a solation coupling module, configured to control an output signal of the isolation coupling module based on the sampling voltage; and a voltage adjusting module, configured to adjust the sampling voltage; in a case that the voltage detection module detects that the sampling voltage is less than a first set value, an optocoupler in the isolation coupling module is controlled to be in an isolating state, so that the output signal of the isolation coupling module is a first level signal, and the voltage adjusting module begins to adjust the sampling voltage; in a case that the voltage detection module detects that the sampling voltage is greater than a second set value, the optocoupler is controlled to be in a coupling state, so that the output signal of the isolation coupling module is a second level signal, and the voltage adjusting module stops adjusting the sampling voltage, the second set value is greater than the first set value, and a difference between the second set value and the first set value is greater than a preset threshold, the first level signal is different from the second level signal.

Optionally, the voltage detection module comprises: a first voltage divider resistor, a second voltage divider resistor, a first capacitor, and a voltage regulator; a first end of the first voltage divider resistor receives the input voltage, and a second end of the first voltage divider resistor is connected to a first end of the second voltage divider resistor to form a first node, the first voltage divider resistor and the second voltage divider resistor are configured to divide the input voltage so that a voltage of the first node is the sampling voltage, the first end of the second voltage divider resistor is electrically connected to a first end of the first capacitor and a first pin of the voltage regulator, and a second end of the second voltage divider resistor is electrically connected to a second end of the first capacitor and a third pin of the voltage regulator, respectively; a first end of the first capacitor is electrically connected to the first pin of the voltage regulator, and the second end of the first capacitor is electrically connected to the third pin of the voltage regulator; a second pin of the voltage regulator is connected to the isolation coupling module, the third pin of the voltage regulator is connected to a power ground, and the first pin of the voltage regulator is configured to obtain the sampling voltage.

Optionally, in a case that the sampling voltage obtained by the first pin of the voltage regulator is less than the first set value, the voltage regulator is in a cut-off state; in a case that the sampling voltage obtained by the first pin of the voltage regulator is greater than the second set value, the voltage regulator is in a conductive state.

Optionally, the isolation coupling module further comprises: a fifth resistor and a sixth resistor; a first end of the fifth resistor receives a first side supply voltage, and a second end of the fifth resistor is electrically connected to a positive electrode of a light-emitting diode on a primary side of the optocoupler; a first end of the sixth resistor is connected to a second side supply voltage, and a second end of the sixth resistor is electrically connected to a collector electrode of a triode on a secondary side of the optocoupler; a negative electrode of the light-emitting diode on the primary side of the optocoupler is electrically connected to a second pin of the voltage regulator in the voltage detection module, and an emitter electrode of the triode on the secondary side of the optocoupler is connected to a signal ground.

Optionally, the voltage adjusting module comprises: a first voltage stabilizing transistor, a seventh resistor, an eighth resistor, a ninth resistor, and a first switching transistor; a first end of the first voltage stabilizing transistor is electrically connected to a first end of the seventh resistor, and a second end of the first voltage stabilizing transistor is electrically connected to a second end of the fifth resistor in the isolation coupling module; a second end of the seventh resistor is electrically connected to a first end of the eighth resistor and a control end of the first switching transistor, respectively; a first end of the eighth resistor is electrically connected to a control end of the first switching transistor, and a second end of the eighth resistor is electrically connected to a first end of the first switching transistor; a first end of the ninth resistor is electrically connected to a first end of a second voltage divider resistor in the voltage detection module, and a second end of the ninth resistor is electrically connected to a second end of the first switching transistor; a first end of the first switching transistor is respectively connected to a second end of the second voltage divider resistor in the voltage detection module and a power ground.

Optionally, a second voltage divider resistor in the voltage detection module and a ninth resistor in the voltage adjusting module are variable resistors.

Optionally, the first set value is configured to be associated with a resistance value of the second divider resistor; and the second set value is configured to be associated with a resistance value of the ninth resistor.

Optionally, a power ground connected to a voltage regulator in the voltage detection module on a primary side of the optocoupler is not in common ground with a signal ground connected to the secondary side of the optocoupler.

According to another aspect of the present disclosure, an example of the present disclosure provides an emergency lighting circuit, and the emergency lighting circuit comprises a rectification circuit, configured to convert an input AC power into a DC power to provide the DC power to the hysteresis circuit; the hysteresis circuit in any one of the examples of the present disclosure; a control circuit, configured to control an operation of an indicator light or a relay based on the output signal of the isolation coupling module in the hysteresis circuit.

According to another aspect of the present disclosure, an example of the present disclosure provides a lighting device, and the lighting device comprises an emergency lighting circuit as described in any one of the examples of the present disclosure.

The hysteresis circuit, the emergency lighting circuit, and the lighting device provided by the examples of the present disclosure aim to detect a sampling voltage associated with the input voltage. When the sampling voltage is detected to decrease to the trigger action voltage point, the corresponding level of the output signal is controlled to flip until it is detected that the sampling voltage has risen to the reverse recovery voltage point, the corresponding level of the control output signal is controlled to flip again, so as to achieve hysteresis design for the input voltage detection, thereby achieving timely and accurate monitoring of input voltage status, and ensuring that emergency lighting circuits work according to specified requirements, and improving product reliability and safety.

In the above examples, the descriptions of each example have their own emphasis. For parts that are not detailed in one example, please refer to the relevant descriptions of other examples.

The present disclosure may include dedicated hardware implementations such as application specific integrated circuits, programmable logic arrays and other hardware devices. The hardware implementations can be constructed to implement one or more of the methods described herein. Examples that may include the apparatus and systems of various implementations can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the system disclosed may encompass software, firmware, and hardware implementations. The terms “module,” “sub-module,” “circuit,” “sub-circuit,” “circuitry,” “sub-circuitry,” “unit,” or “sub-unit” may include memory (shared, dedicated, or group) that stores code or instructions that can be executed by one or more processors. The module refers herein may include one or more circuit with or without stored code or instructions. The module or circuit may include one or more components that are connected.

The above provides a detailed introduction to a hysteresis circuit, an emergency lighting circuit, and a lighting device provided by the examples of the present disclosure. Specific examples are applied in this article to explain the principles and implementation methods of the present disclosure. The above examples are only used to help understand the technical solution and its core idea of the present disclosure; ordinary technical personnel in this field should understand that they can still modify the technical solutions recorded in the aforementioned examples, or equivalently replace some of the technical features; and these modifications or replacements do not make the essence of the corresponding technical solutions deviate from the scope of the technical solutions of the various examples of the present disclosure.

The invention claimed is:

1. A hysteresis circuit, comprising:

a voltage detection module, configured to receive an input voltage and generate a sampling voltage based on the input voltage, and detect the sampling voltage, wherein the voltage detection module comprises: one or more first voltage divider resistor, a second voltage divider resistor, a first capacitor, and a voltage regulator, wherein the one or more first voltage divider resistor is connected to the second voltage divider resistor to form a first node, the one or more first voltage divider resistor and the second voltage divider resistor are configured to divide the input voltage so that a voltage of the first node is the sampling voltage, the second voltage divider resistor is electrically connected to the first capacitor and the voltage regulator, and the voltage regulator is configured to obtain the sampling voltage;

an isolation coupling module, wherein the isolation coupling module is connected to the voltage regulator and configured to control an output signal of the isolation coupling module based on the sampling voltage; and a voltage adjusting module, configured to adjust the sampling voltage;

wherein in a case that the voltage detection module detects that the sampling voltage is less than a first set value, an optocoupler in the isolation coupling module is controlled to be in an isolating state, so that the output signal of the isolation coupling module is a first level signal, and the voltage adjusting module begins to adjust the sampling voltage; in a case that the voltage detection module detects that the sampling voltage is greater than a second set value, the optocoupler is controlled to be in a coupling state, so that the output signal of the isolation coupling module is a second level signal, and the voltage adjusting module stops adjusting the sampling voltage, the second set value is greater than the first set value, and a difference between the second set value and the first set value is greater than a preset threshold, the first level signal is different from the second level signal.

2. The hysteresis circuit according to claim 1, wherein:

the one or more first voltage divider resistor comprises a first resistor, a second resistor, and a third resistor, and the second voltage divider resistor is a fourth resistor; a first end of the one or more first voltage divider resistor receives the input voltage, and a second end of the one or more first voltage divider resistor is connected to a first end of the second voltage divider resistor to form the first node, the first end of the second voltage divider resistor is electrically connected to a first end of the first capacitor and a first pin of the voltage regulator, and a second end of the second voltage divider resistor is electrically connected to a second end of the first capacitor and a third pin of the voltage regulator, respectively; the first end of the first capacitor is electrically connected to the first pin of the voltage regulator, and the second end of the first capacitor is electrically connected to the third pin of the voltage regulator; a second pin of the voltage regulator is connected to the isolation coupling module, the third pin of the voltage regulator is connected to a power ground, and the first pin of the voltage regulator is configured to obtain the sampling voltage.

3. The hysteresis circuit according to claim 2, wherein:

in a case that the sampling voltage obtained by the first pin of the voltage regulator is less than the first set value, the voltage regulator is in a cut-off state; in a case that the sampling voltage obtained by the first pin of the voltage regulator is greater than the second set value, the voltage regulator is in a conductive state.

4. The hysteresis circuit according to claim 2, wherein:

the isolation coupling module further comprises: a fifth resistor and a sixth resistor; a first end of the fifth resistor receives a first side supply voltage, and a second end of the fifth resistor is electrically connected to a positive electrode of a light-emitting diode on a primary side of the optocoupler; a first end of the sixth resistor is connected to a second side supply voltage, and a second end of the sixth resistor is electrically connected to a collector electrode of a triode on a secondary side of the optocoupler; a negative electrode of the light-emitting diode on the primary side of the optocoupler is electrically connected to a second pin of the voltage regulator in the voltage detection module, and an emitter electrode of the triode on the secondary side of the optocoupler is connected to a signal ground.

5. The hysteresis circuit according to claim 4, wherein:

the voltage adjusting module comprises: a first voltage stabilizing transistor, a seventh resistor, an eighth resistor, a ninth resistor, and a first switching transistor; a first end of the first voltage stabilizing transistor is electrically connected to a first end of the seventh resistor, and a second end of the first voltage stabilizing transistor is electrically connected to a second end of the fifth resistor in the isolation coupling module; a second end of the seventh resistor is electrically connected to a first end of the eighth resistor and a control end of the first switching transistor, respectively; a first end of the eighth resistor is electrically connected to a control end of the first switching transistor, and a second end of the eighth resistor is electrically connected to a first end of the first switching transistor; a first end of the ninth resistor is electrically connected to a first end of a second voltage divider resistor in the voltage detection module, and a second end of the ninth resistor is electrically connected to a second end of the first switching transistor; a first end of the first switching transistor is respectively connected to a second end of the second voltage divider resistor in the voltage detection module and a power ground.

6. The hysteresis circuit according to claim 5, wherein:

a second voltage divider resistor in the voltage detection module and a ninth resistor in the voltage adjusting module are variable resistors.

7. The hysteresis circuit according to claim 6, wherein:

the first set value is configured to be associated with a resistance value of the second divider resistor; and the second set value is configured to be associated with a resistance value of the ninth resistor.

8. The hysteresis circuit according to claim 1, wherein:

a power ground connected to a voltage regulator in the voltage detection module on a primary side of the optocoupler is not in common ground with a signal ground connected to the secondary side of the optocoupler.

9. An emergency lighting circuit, comprising:

a rectification circuit, configured to convert an input AC power into a DC power to provide the DC power to the hysteresis circuit;

a hysteresis circuit that comprises:

a voltage detection module, configured to receive an input voltage and generate a sampling voltage based on the input voltage, and detect the sampling voltage, wherein the voltage detection module comprises: one or more first voltage divider resistor, a second voltage divider resistor, a first capacitor, and a voltage regulator, wherein the one or more first voltage divider resistor is connected to the second voltage divider resistor to form a first node, the one or more first voltage divider resistor and the second voltage divider resistor are configured to divide the input voltage so that a voltage of the first node is the sampling voltage, the second voltage divider resistor is electrically connected to the first capacitor and the voltage regulator, and the voltage regulator is configured to obtain the sampling voltage;

an isolation coupling module, wherein the isolation coupling module is connected to the voltage regulator and configured to control an output signal of the isolation coupling module based on the sampling voltage; and a voltage adjusting module, configured to adjust the sampling voltage;

wherein in a case that the voltage detection module detects that the sampling voltage is less than a first set value, an optocoupler in the isolation coupling module is controlled to be in an isolating state, so that the output signal of the isolation coupling module is a first level signal, and the voltage adjusting module begins to adjust the sampling voltage; in a case that the voltage detection module detects that the sampling voltage is greater than a second set value, the optocoupler is controlled to be in a coupling state, so that the output signal of the isolation coupling module is a second level signal, and the voltage adjusting module stops adjusting the sampling voltage, the second set value is greater than the first set value, and a difference between the second set value and the first set value is greater than a preset threshold, the first level signal is different from the second level signal; and a control circuit, configured to control an operation of an indicator light or a relay based on the output signal of the isolation coupling module in the hysteresis circuit.

10. A lighting device, comprising an emergency lighting circuit, wherein the emergency lighting circuit comprises:

a rectification circuit, configured to convert an input AC power into a DC power to provide the DC power to the hysteresis circuit;

a hysteresis circuit that comprises:

a voltage detection module, configured to receive an input voltage and generate a sampling voltage based on the input voltage, and detect the sampling voltage, wherein the voltage detection module comprises: one or more first voltage divider resistor, a second voltage divider resistor, a first capacitor, and a voltage regulator, wherein the one or more first voltage divider resistor is connected to the second voltage divider resistor to form a first node, the one or more first voltage divider resistor and the second voltage divider resistor are configured to divide the input voltage so that a voltage of the first node is the sampling voltage, the second voltage divider resistor is electrically connected to the first capacitor and the voltage regulator, and the voltage regulator is configured to obtain the sampling voltage;

an isolation coupling module, wherein the isolation coupling module is connected to the voltage regulator and configured to control an output signal of the isolation coupling module based on the sampling voltage; and a voltage adjusting module, configured to adjust the sampling voltage;

wherein in a case that the voltage detection module detects that the sampling voltage is less than a first set value, an optocoupler in the isolation coupling module is controlled to be in an isolating state, so that the output signal of the isolation coupling module is a first level signal, and the voltage adjusting module begins to adjust the sampling voltage; in a case that the voltage detection module detects that the sampling voltage is greater than a second set value, the optocoupler is controlled to be in a coupling state, so that the output signal of the isolation coupling module is a second level signal, and the voltage adjusting module stops adjusting the sampling voltage, the second set value is greater than the first set value, and a difference between the second set value and the first set value is greater than a preset threshold, the first level signal is different from the second level signal; and a control circuit, configured to control an operation of an indicator light or a relay based on the output signal of the isolation coupling module in the hysteresis circuit.

* * * * *